(12) United States Patent
Schittko

(10) Patent No.: US 9,352,677 B2
(45) Date of Patent: May 31, 2016

(54) VEHICLE SEAT COMPRISING A COVER

(71) Applicant: JOHNSON CONTROLS GMBH, Burscheid (DE)

(72) Inventor: Andreas Schittko, Port Elizabeth (ZA)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/415,842

(22) PCT Filed: Jun. 20, 2013

(86) PCT No.: PCT/EP2013/062930
§ 371 (c)(1),
(2) Date: Jan. 20, 2015

(87) PCT Pub. No.: WO2014/012740
PCT Pub. Date: Jan. 23, 2014

(65) Prior Publication Data
US 2015/0183350 A1   Jul. 2, 2015

(30) Foreign Application Priority Data

Jul. 20, 2012 (DE) .......... 10 2012 014 378
Sep. 27, 2012 (DE) .......... 10 2012 018 986

(51) Int. Cl.
*B60N 2/58* (2006.01)
*B60N 2/60* (2006.01)

(52) U.S. Cl.
CPC ............ *B60N 2/5841* (2013.01); *B60N 2/5825* (2013.01); *B60N 2/5875* (2013.01); *B60N 2/6009* (2013.01); *B60N 2/6027* (2013.01); *B60N 2/6045* (2013.01)

(58) Field of Classification Search
CPC .. B60N 2/5825; B60N 2/5841; B60N 2/6009; B60N 2/6027; B60N 2/6045; B60N 2/5875
USPC .......................................... 297/452.59, 452.6
See application file for complete search history.

(56) References Cited

U.S. PATENT DOCUMENTS 3,300,251 A * 1/1967 Helms ........................ 297/451.4
5,799,970 A   9/1998 Enders
6,612,648 B1 * 9/2003 Hashiguchi ................ 297/218.1

FOREIGN PATENT DOCUMENTS

| DE | 10 90 112 B | 9/1960 |
|---|---|---|
| DE | 38 41 531 A1 | 6/1990 |
| DE | 39 26 421 A1 | 2/1991 |
| DE | 699 05 643 T2 | 11/2003 |
| DE | 10 2004 020913 B3 | 9/2005 |
| DE | 10 2007 053009 A1 | 10/2008 |
| FR | 002690610 A1 * | 11/1993 |
| WO | 2011/102951 A1 | 8/2011 |

* cited by examiner

*Primary Examiner* — Milton Nelson, Jr.
(74) *Attorney, Agent, or Firm* — McGlew and Tuttle, P.C.

(57) ABSTRACT

A vehicle seat includes a cover (1) and a side covering (5). A reinforcing strip (3) is provided at least in sections of the edge region of the cover (1) and is arranged in a gap (4) between the cushion (2) and the side covering (5).

20 Claims, 1 Drawing Sheet

VEHICLE SEAT COMPRISING A COVER

CROSS REFERENCE TO RELATED APPLICATIONS

This application is a United States National Phase Application of International Application PCT/EP2013/062930 filed Jun. 20, 2013 and claims the benefit of priority under 35 U.S.C. §119 of German Patent Applications DE 10 2012 014 378.8 filed Jul. 20, 2012 and DE 10 2012 018 986.9 filed Sep. 27, 2012, the entire contents of which are incorporated herein by reference.

FIELD OF THE INVENTION

The present invention relates to a vehicle seat comprising a cushion which has a cover and a side covering.

BACKGROUND OF THE INVENTION

Vehicle seats of this type are well known from the prior art. However, a continuing problem with these vehicle seats is to fasten the cover to the vehicle seat in a simple, aesthetically attractive manner.

SUMMARY OF THE INVENTION

It was therefore an object of the present invention to provide a vehicle seat in which a cover which satisfies stringent aesthetic demands can be fastened to the vehicle seat in a simple manner.

The problem is achieved by a vehicle seat comprising a cushion which has a cover and a side covering, wherein a reinforcing strip is provided at least in sections of the edge region of the cover and in a gap between the cushion and the side covering.

The vehicle seat according to the invention can be manufactured in a visually attractive and simple manner. The cushion has only a few, if any, visible seams in the edge region. An additional fastening means is preferably not required. The cover is perfectly adapted to the padding. The cover can be positioned very precisely on the cushion.

The present invention relates to a vehicle seat, the seat part and/or backrest of which has a cushion, preferably a foam cushion, which is covered with a cover, for example, made of cloth and/or leather. Furthermore, the backrest and/or the seat part in each case have a side covering which in each case at least partially covers the frame of the seat part and/or of the backrest and which partially covers the cushion in each case in the side region.

The reinforcing strip is preferably a plastic strip, a cardboard strip and/or an oiled paper strip. The cross section of the reinforcing strip is preferably in the form of a half arrow. The reinforcing strip preferably projects beyond the edge of the cover. The reinforcing strip can be connected to the edge of the cover in any way familiar to a person skilled in the art. However, the reinforcing strip is preferably connected to the edge of the cover by at least one or more than one seam.

The seam preferably runs parallel to the edge of the cover. The reinforcing strip is preferably designed to be of such flexibility that it adapts to the shape of the cushion.

The edge region of the cover preferably has a fold. Said fold preferably extends along that end of the reinforcing strip which is covered by the cover.

According to the invention, a gap is provided between the cushion, for example a foam cushion, and the side covering. The shape of the cushion and/or the shape of the side covering are preferably co-ordinated with each other in such a manner that the gap has a substantially constant width. This gap receives the edge region of the cover and the reinforcing strip and thereby fastens the cover between the cushion and the side covering. In particular, the reinforcing strip is clamped fixedly in the gap.

The cover is preferably fastened to the cushion by the cover being pulled onto the cushion and then the edge region of the cover being folded around the end covered by the cover and, in the process or subsequently, being introduced into the gap. The reinforcing strip is preferably only inserted into the gap. A further fastening preferably does not take place. Alternatively, the cushion is first covered with the cover, the reinforcing strip is folded therearound and then the side covering is fitted.

A lamination which can be manufactured from the same material as the cover or from different material is preferably provided on the edge region of the cover and/or on the reinforcing strip. The lamination can be provided for visual reasons and/or in order to provide more grip for the reinforcing strip in the gap. For example, the lamination can serve for additionally clamping the reinforcing strip in the gap. The lamination is preferably manufactured from a material similar to carpet. In addition, the lamination can be provided in order to reduce noise, for example during the adjustment of the back rest relative to the seat part and/or during the travel of the vehicle in which the vehicle seat according to the invention is provided.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
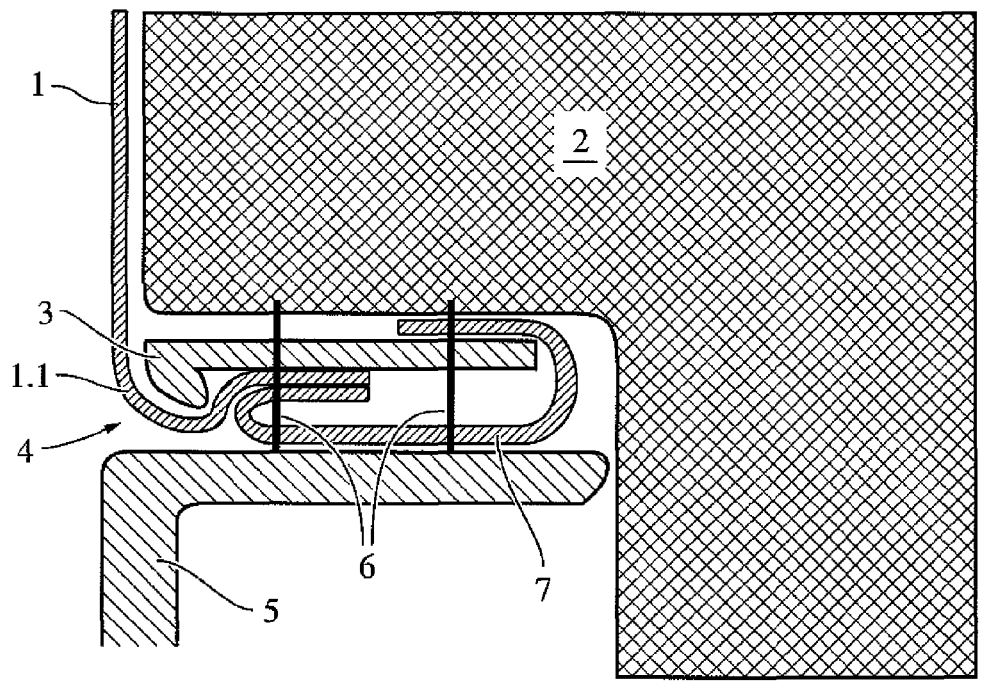
FIG. 1 is a sectional view showing a first embodiment of the cushion of the vehicle seat according to the invention.

FIG. 1 schematically shows the cushion (padding) 2 of a vehicle seat, which cushion is at least partially surrounded by a side covering (side part) 5. The cushion and optionally parts of the frame of the vehicle seat are covered with a cover 1. The edge region of said cover 1 has a reinforcing strip 3 which, in the present case, has the cross section of a half arrow. The reinforcing strip 3 may be formed of plastic. The reinforcing strip 3 is arranged on the edge of the cover in such a manner that its one end projects beyond the edge of the cover and its other end, here the half arrow point, is covered by the cover. In the present case, the cover and the reinforcing strip 3 are connected to each other by a seam 6 which runs parallel to the edge of the cover. A lamination 7 which can be manufactured from the same material as the cover or from a different material is preferably also provided in the edge region of the cover 1. Said lamination 7 is connected to the reinforcing strip 3 and to the cover 1 by a seam and to the reinforcing strip 3 by a further seam 6. The cover 1 is arranged on the cushion 2 by the cover 1 first of all being pulled over the cushion. The reinforcement 3 is subsequently folded around the fold 1.1 and inserted into a gap 4 which is located between the cushion 2 and the side covering 5. In the process, the reinforcing strip is clamped in the gap and, as a result, is no longer removed automatically therefrom. In the present case, the clamping in the gap is further improved by the lamination 7 which additionally fills the gap and can also result in additional friction between the cushion 2 and/or the side covering 5. The half arrow point of the reinforcing strip 3 ensures that a rounded and therefore aesthetically attractive edge of the cover 1 arises in the region of the arrow point and/or that the seam which runs behind the half arrow is covered.

Figure 2:
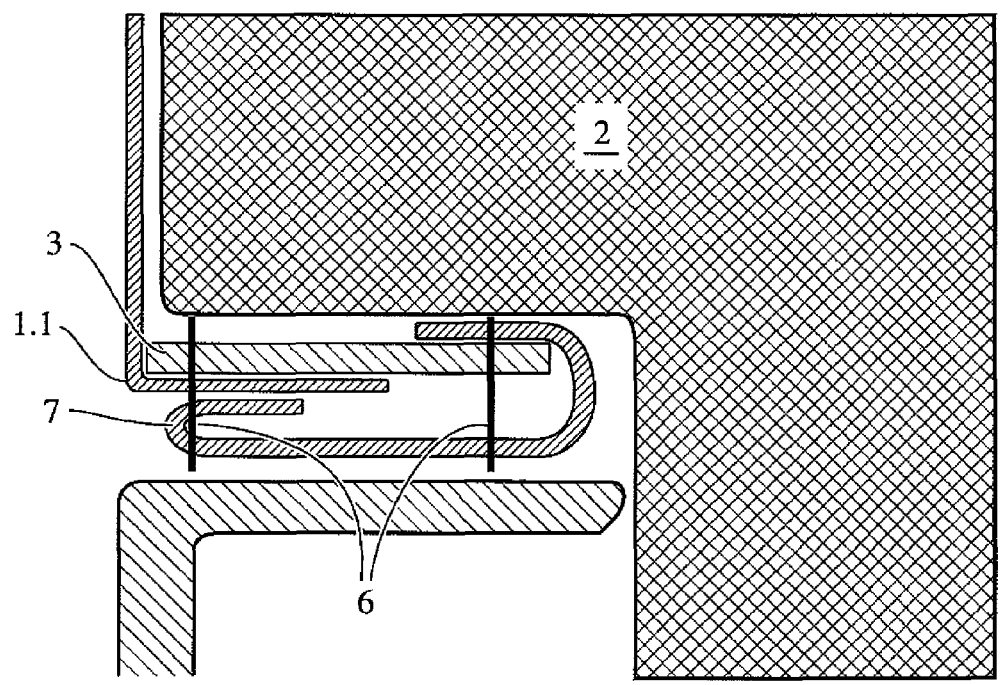
FIG. 2 is a sectional view showing a second embodiment of the cushion of the vehicle seat according to the invention.

FIG. 2 essentially shows the embodiment according to FIG. 1, with the reinforcing strip 3 in the present case having a rectangular cross section. Furthermore, in the present case, the seams 6 are moved somewhat further apart. Otherwise, reference is made to the embodiment according to FIG. 1. In FIG. 2, the reinforcing strip 3 does not have a half arrow point, and therefore a virtually right angled edge of the cover 1 arises in the region of the reinforcing strip 3. The visible edge of the cover 1 can advantageously therefore be formed in a desired manner by the shape of the end region of the reinforcing strip 3.

While specific embodiments of the invention have been shown and described in detail to illustrate the application of the principles of the invention, it will be understood that the invention may be embodied otherwise without departing from such principles.

The invention claimed is:

1. A vehicle seat comprising:
   a cushion;
   a cushion cover having an edge region;
   a cushion side covering; and
   a reinforcing strip provided at least in sections of the edge region of the cover and arranged in a gap between the cushion and the side covering, wherein a lamination comprises one of the same material as the cover and a different material from the cover, said lamination being provided on one or more of the edge region of the cover and the reinforcing strip, wherein the lamination is connected to the reinforcing strip and to the cover by a seam and the lamination is connected to the reinforcing strip by a further seam, wherein the lamination clamps the reinforcing strip in the gap and the lamination reduces noise of the vehicle seat.

2. The vehicle seat as claimed in claim 1, wherein the reinforcing strip is manufactured from a stable material, in the form of a plastic strip, cardboard strip or oiled paper strip.

3. The vehicle seat as claimed in claim 1, wherein a cross section of the reinforcing strip is in the form of a half arrow.

4. The vehicle seat as claimed in claim 1, wherein the reinforcing strip projects beyond the edge region of the cover.

5. The vehicle seat as claimed in claim 1, wherein the reinforcing strip is connected to the edge region of the cover by at least one or more than one seam, wherein the seam runs parallel to an edge of the cover.

6. The vehicle seat as claimed in claim 1, wherein the reinforcing strip is designed to be of such flexibility that the reinforcing strip adapts to a shape of the cushion.

7. The vehicle seat as claimed in claim 1, wherein the edge region of the cover has a fold which extends along an end of the reinforcing strip which is covered by the cover.

8. The vehicle seat as claimed in claim 1, wherein the gap has substantially constant width.

9. A vehicle seat comprising:
   a cushion;
   a cushion cover having an edge region;
   a cushion side covering;
   a reinforcing strip provided at least in sections of the edge region of the cover and arranged in a gap between the cushion and the side covering;
   a lamination comprising a first lamination portion and a second lamination portion, said first lamination portion being arranged between said cushion side covering and said reinforcing strip, said second lamination portion being arranged between said reinforcing strip and said cushion;
   a first seam, said lamination and said cushion cover being connected to said reinforcing strip via said first seam;
   a second seam, said lamination being connected to the reinforcing strip via said second seam.

10. The vehicle seat in accordance with claim 9, wherein the lamination clamps the reinforcing strip in the gap and the lamination reduces noise of the vehicle seat, said lamination comprising one of the same material as the cover and a different material from the cover.

11. The vehicle seat in accordance with claim 10, wherein said first seam and said second seam are provided in said gap, said first lamination portion comprising a first lamination end portion, said first lamination end portion engaging said cushion covering, said second lamination portion comprising a second lamination end portion, said second lamination end portion engaging said reinforcing strip, wherein said first seam and said second seam are parallel to at least a portion of said cushion covering.

12. The vehicle seat in accordance with claim 10, wherein said first seam and said second seam are provided between said cushion and said cushion side covering.

13. The vehicle seat in accordance with claim 10, wherein said first seam and said second seam are provided in said gap.

14. The vehicle seat in accordance with claim 13, wherein said first seam and said second seam are parallel to at least a portion of said cushion covering.

15. The vehicle seat in accordance with claim 10, wherein said first lamination portion comprises a first lamination end portion, said first lamination end portion engaging said cushion covering, said second lamination portion comprising a second lamination end portion, said second lamination end portion engaging said reinforcing strip.

16. The vehicle seat in accordance with claim 15, wherein said first lamination end portion is located on one side of said reinforcing strip, said second lamination end portion being located on another side of said reinforcing strip.

17. A vehicle seat comprising:
   a cushion;
   a cushion cover having an edge region;
   a cushion side covering, said cushion cover and said cushion side covering defining a gap;
   a reinforcing strip provided at least in sections of the edge region of the cover and arranged in said gap, said reinforcing strip comprising a first side and a second side, said first side facing in a direction of said cushion, said second side facing in a direction of said cushion side covering;
   a lamination comprising a first lamination portion and a second lamination portion, said first lamination portion being arranged on said first side, said second lamination being arranged on said second side;
   a plurality of seams, said lamination and said cushion cover being connected to said reinforcing strip via one of said plurality of seams;
   a second seam, said lamination being connected to the reinforcing strip via another one of said plurality of seams.

18. The vehicle seat in accordance with claim 17, wherein said first lamination portion is located between said cushion side covering and said reinforcing strip, said second lamination portion being arranged between said reinforcing strip and said cushion.

19. The vehicle seat in accordance with claim 17, wherein the lamination clamps the reinforcing strip in the gap and the lamination reduces noise of the vehicle seat, said lamination comprising one of the same material as the cover and a different material from the cover.

20. The vehicle seat in accordance with claim 17, wherein said plurality of seams are provided between said cushion and said cushion side covering.

* * * * *